Feb. 9, 1937.  J. A. JOHNSON  2,069,762
APPARATUS FOR FEEDING RECEPTACLE CLOSURE CAPS
Filed May 9, 1934  3 Sheets-Sheet 2

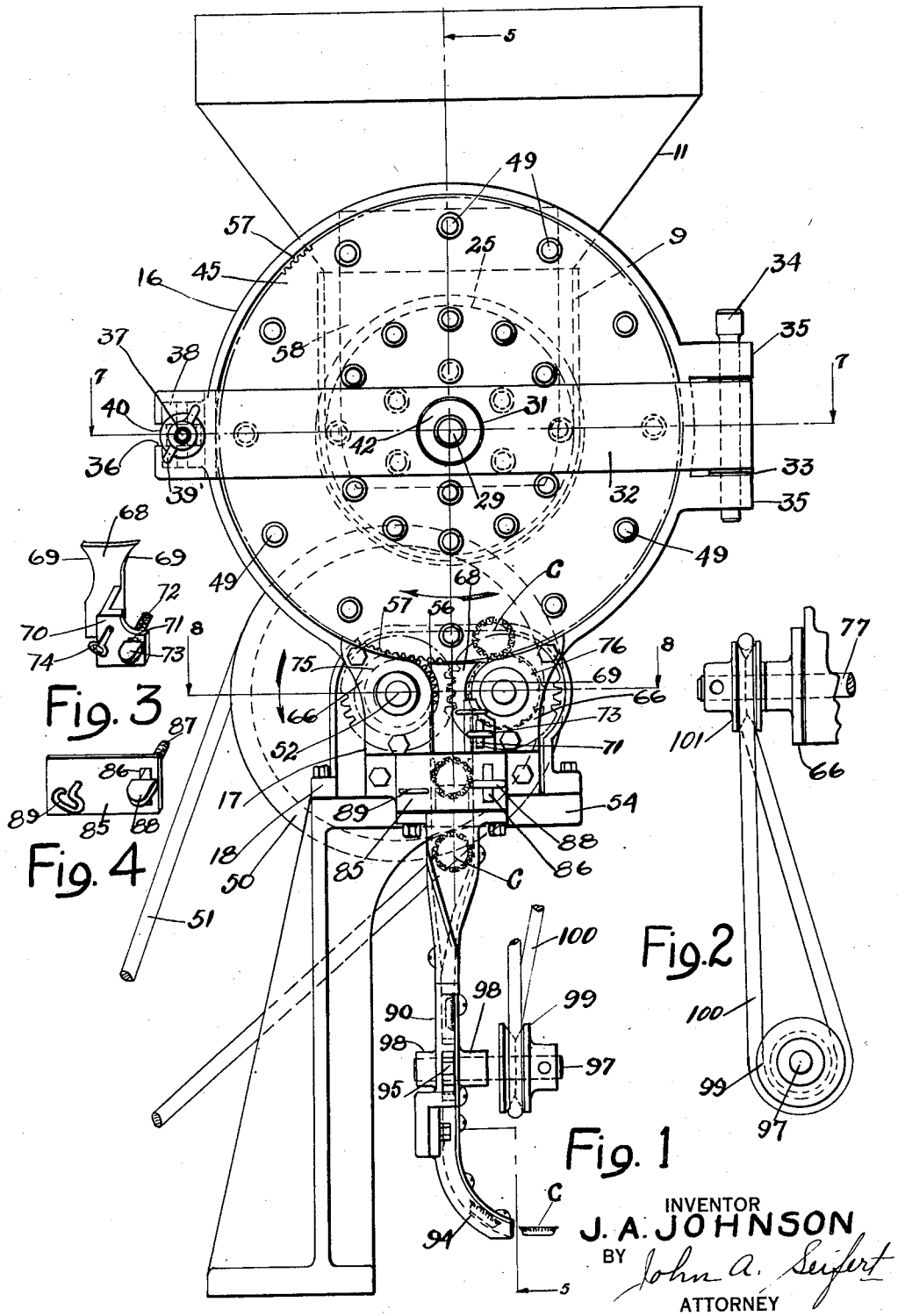

INVENTOR
J.A. JOHNSON
BY John A. Seifert
ATTORNEY

Feb. 9, 1937.    J. A. JOHNSON    2,069,762
APPARATUS FOR FEEDING RECEPTACLE CLOSURE CAPS
Filed May 9, 1934    3 Sheets-Sheet 3
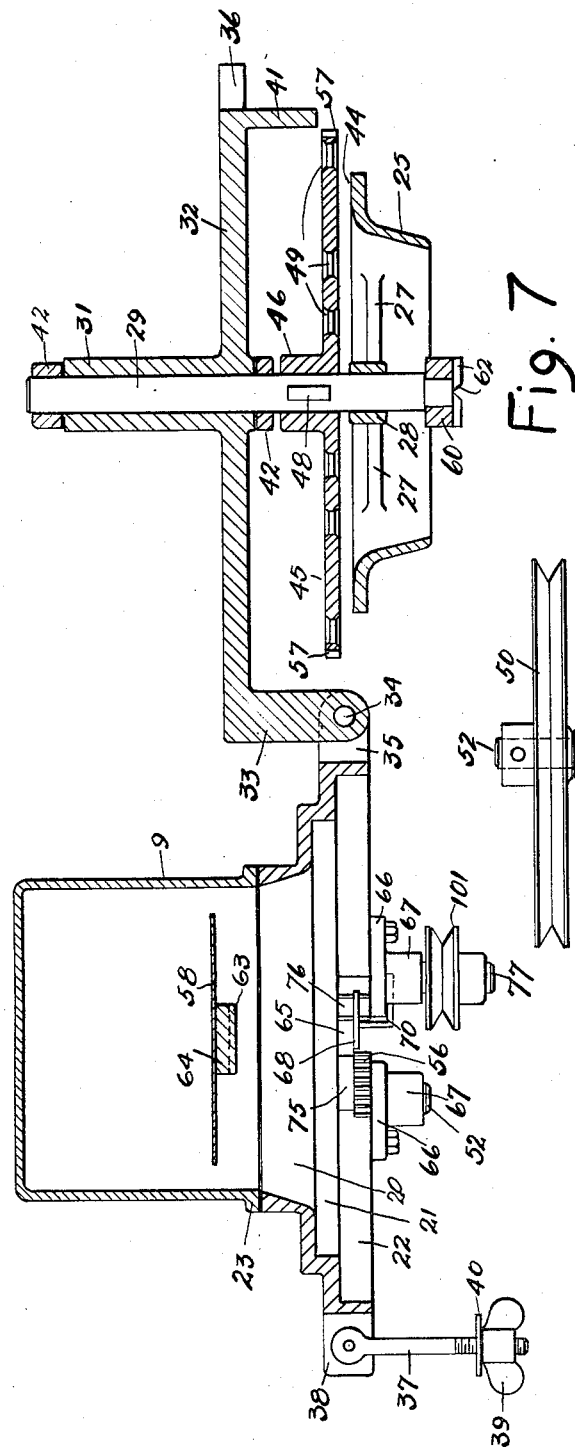
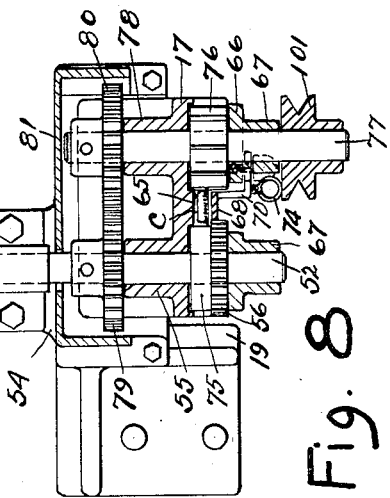
INVENTOR
J. A. JOHNSON
BY John A. Seifert
ATTORNEY Patented Feb. 9, 1937

2,069,762

UNITED STATES PATENT OFFICE 2,069,762

APPARATUS FOR FEEDING RECEPTACLE CLOSURE CAPS

John A. Johnson, Woodhaven, N. Y.

Application May 9, 1934, Serial No. 724,689

10 Claims. (Cl. 113—114)

This invention relates to apparatus for feeding receptacle closure caps to apparatus for assembling liners in the caps or to machines for applying the closure caps to receptacles, whereby the caps are delivered to the designated apparatus in predetermined position.

It is the principal object of the invention of this application to provide apparatus that will assure a continuous and positive delivery of caps to the designated apparatus in predetermined position regardless of the speed of the operation of said designated apparatus.

It is another object of the invention to provide in apparatus of this character means to permit of inspection of caps in a hopper of the apparatus without stopping the operation of the apparatus, and means to agitate the caps in the hopper and prevent the caps from jamming the outlet of the hopper.

It is a further object of the invention to arrange the operating parts of the apparatus to permit easy access thereto to adjust and replace said parts.

A still further object of the invention is to provide means that will prevent jamming of caps in a discharge chute and assure a positive and continuous discharge of caps from a hopper of the apparatus through said chute.

Further objects and advantages of the invention will be disclosed in detail.

The invention embodies a hopper casing having a bottom declining from an end wall arranged with a cap inspection and removal opening to an opposite open end which is partly obstructed by a vibratory plate to agitate and cause the orderly discharge of caps into a continuously rotatable drum at said open end and having an annular passage for caps in flat position with means to engage the caps in the annular passage and urge them into a chute in communication with the annular passage to receive caps with the faces thereof extending either in an inward or outward direction and arranged to position all of the caps to extend in the same direction during the passage of the caps through the chute and maintain a supply of the caps as a reserve to the discharge of caps from the chute without interfering with said discharge.

In the drawings accompanying and forming a part of this application, Figure 1 is an elevational view looking at the front of the apparatus and showing an embodiment of the invention.

Figure 2 is a fragmentary view of an operative connection between the means to engage and urge the caps into the chute and means to maintain a reserve supply of caps in the chute.

Figure 3 is a perspective view of a removable section of the chute wall adjacent the drum and means to urge the caps into the chute.

Figure 4 is a perspective view of another removable section of the chute wall relative to means for selecting and separating the differently positioned caps in the chute.

Figure 7 is a cross sectional view taken on the line 7—7 of Figure 1 looking in the direction of the arrows and showing the drum positioned away from the open end of the hopper casing; and Figure 8 is a cross sectional view taken on the line 8—8 of Figure 1 looking in the direction of the arrows and showing actuating means for the operating parts of the apparatus.

Figures 5, 6:
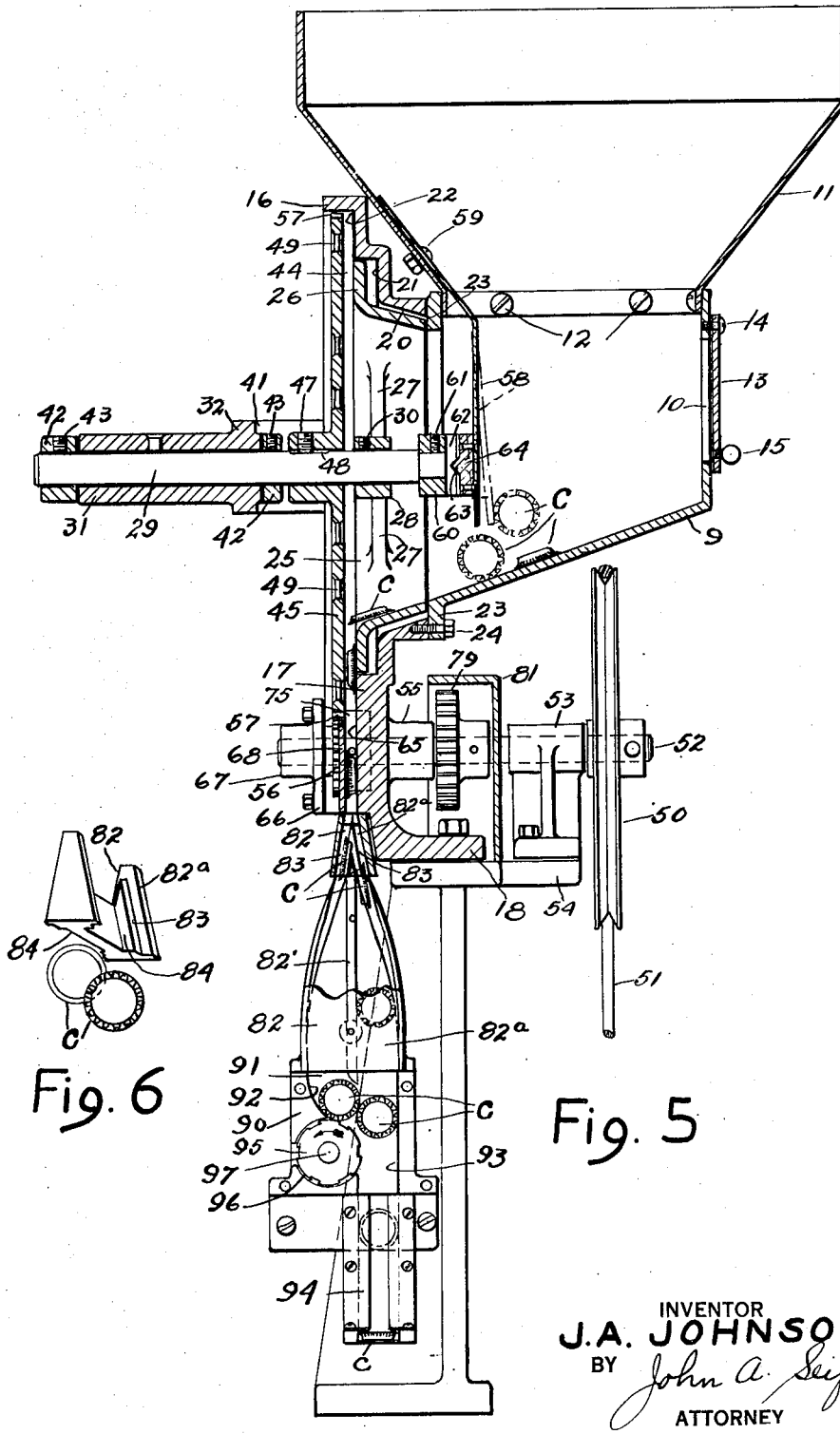
Figure 5 is a longitudinal sectional view taken on the line 5—5 of Figure 1 looking in the direction of the arrows.
Figure 6 is a perspective view of the cap selecting and separating means of the chute.

In carrying out the invention illustrated in the accompanying drawings, there is provided a hopper comprising a casing 9 having an arcuate bottom, as shown in Figure 1, sloping or declining from an end wall arranged with an opening 10 therein to the opposite end which is completely open, the top portion of the casing being open and adapted to support a funnel-shaped member 11 at the smaller end thereof by engaging a flanged portion of said member within the open top of the casing and secured therein by screws, as shown at 12 in Figure 5. The opening 10 in the casing permits of inspection of the interior of the casing and is large enough to permit the operator to reach into the casing and dislodge any caps that may have become jammed or clustered in the casing, said opening being normally closed by a closure plate 13 pivoted at 14 on the casing wall and having a manipulating nob 15 fixed to the closure adjacent the lower free edge thereof, as shown in Figure 5.

The hopper is mounted in elevated relation to the apparatus to which the caps are to be fed by an annular or ring portion 16 of a bracket 17 arranged with a base portion 18 engaged and secured upon a pedestal or standard 19 adapted to be mounted on or relative to the apparatus, not shown, to which the caps are to be fed. The ring 16 is composed of a series of connected portions of progressively increased diameters, as indicated at 20, 21 and 22, with the portion 20 of least diameter slightly greater than the open end of the casing 9 and the end thereof engaging an angular flange 23 extended from the wall at said open casing end and fixed thereto by bolts 24, as shown in Figure 5.

The closure caps C are illustrated in the present instance to be of the crown type, but may be of any other known type, such as caps having a screw threaded skirt, are supplied to the hopper from the member 11 and by the angle of the bottom of the casing 9 they move by gravity toward the open casing end and ring 16 within which ring they are tumbled about to place them in flat position by a drum 25 of conical form and of a diameter slightly less than the ring portion 20 which has the wall thereof extending parallelly to the wall of the drum. The end of larger diameter of the drum is flanged outwardly to an extent to be fully engaged in the ring portion 21 with the outer surface thereof flush with the bottom wall of the ring portion 22, as shown at 26. The drum 25 is rotatably mounted in the ring 16 with the wall thereof extending flush with and as a continuation of the bottom wall of the casing 9 by a series of spokes 27 diverging inwardly from and intermediate the ends of the drum and terminating and connected to a hub 28 engaged on and fixed to a shaft 29, as by a set screw 30.

The drum is adjustable away from and into the ring 16 to facilitate inspection and replacement of parts by rotatably mounting the shaft 29 in an elongated sleeve 31 extended laterally from and centrally of an arm 32 having an angular extension 33 at one end engaged between and pivotally connected by a headed pintle 34 to a pair of spaced ears 35 projecting laterally from the ring 16. The drum is retained in position in the ring 16 by a bifurcation 36 at the end of the arm opposite the end having the extension 33 to be releasably engaged by a hasp 37 pivotally mounted in a bifurcated ear 38 extended laterally from the ring 16 diametrically opposite to the ears 35, the hasp being in the form of a bolt having screw threaded thereon a wing nut 39 adapted to be adjusted to abut the arm bifurcation 36 with an interposed washer 40, as shown in Figure 1. The drum is positioned to the proper extent in the ring portions by an abutment 41 extended inwardly from the arm at the inner end of the bifurcation 36 engaging the outer edge of the ring when the drum is positioned within the ring. The shaft 29 is held in the sleeve 31 against longitudinal movement by collars 42 fixed on the shaft at the opposite ends of the sleeve 31 by set screws 43.

The flanged end 26 of the drum is closed and arranged with an annular passage 44 of a width slightly greater than the height or thickness of the caps to permit the caps to pass through said passage from the drum only in flat vertical position. The passage is formed by a plate or disk 45 of a diameter slightly less than the diameter of the ring portion 22 to permit free rotation of the disk within said portion and is rotated simultaneously with the drum by fixedly mounting the disk on the shaft 29 through a hub 46 axially of the disk engaged and fixed on the shaft by a set screw 47 threaded into the hub engaging an elongated recess 48 in the shaft to permit positioning the disk in predetermined spaced relation to the drum flange 26. The peripheral portion of the disk 45 forms an annular recess of rectangular shape in cross section with the corner section of the ring portion 22, as shown in Figure 5, in which the caps engage by the rotation of the drum and disk to position the caps for a ready discharge of the same from the hopper, as hereinafter set forth in detail. The disk 45 is arranged with a plurality of circular series of holes 49, as clearly shown in Figure 1, to permit of observation of the interior of the hopper from the front end thereof without moving the disk and drum away from the ring, said holes being of a diameter smaller than the diameter of the caps to prevent interference with the discharge of the caps.

The drum and disk are actuated from a suitable source of power, such as an electric motor, (not shown), through a peripherally grooved pulley 50 connected to and driven from the electric motor by a belt 51 engaged around the said pulley and a pulley on the shaft of the motor. The pulley 50 is fixed on an end of a shaft 52 rotatably mounted adjacent said pulley in a bearing of a bracket 53 fixed on a shelf 54 extended laterally from the top of standard 19, the opposite end of the shaft being rotatably mounted in a boss 55 extended from the bracket 17 with the end of the shaft extended beyond the face of the bracket 17 opposite the boss 55 and having fixed thereon a pinion 56 meshing with teeth about the periphery of the disk 45, as shown at 57, to positively actuate the drum and disk.

To assure a continuous supply of caps to be engaged in the passage 44 of the drum and prevent the collecting of the caps in an interlocking mass in the casing 9, the caps in the casing are agitated by a plate 58 of resilient material, such as spring steel, fixed at one end to the converging wall of the funnel 11 by bolts, as at 59 in Figure 5, and extended into the casing in a direction parallelly of said converging wall to a point within the casing where the plate is bent to have the portion thereof within the casing extended substantially parallelly of and in spaced relation to the open end of the casing, the lower free end of the plate terminating in spaced relation to the sloping bottom of the casing 9 with the space between the plate and bottom adjacent the vertical axis of the casing being slightly greater than the diameter of the caps, as clearly shown in Figure 5, to assure an orderly or even delivery of caps to the passage 44. The fixed end portion of the agitator plate 58 will guide and direct the caps into the casing 9 on the inner side of the plate. The plate is vibrated in an inward direction relative to the casing simultaneously with the rotation of the drum 25 and disk 45 by a head 60 fixed on a reduced end of the shaft 29 adjacent the plate by a set screw, as shown at 61 in Figure 5, the face of the head having a series of transverse grooves or recesses 62 of V-shape in cross section to engage a V-shaped ridge 63 extended transversely of the face of a block 64 fixed to the face of the plate 58 opposed to the head 60. The rotation of the head 60 will cause the recesses 62 therein to ride over the ridge 63 of block 64 and move the plate 58 to the dotted line position shown in Figure 5, the inherent resiliency of the plate urging the block 64 toward the head 60.

By the rotation of the drum 25 and disk 45 the caps are positioned in the passage 44 relative to the inlet of a channel or chute 65 in the outer face of the bracket 17 formed by removing the section of the side wall of the ring portion 22 below and in line with the axis thereof and conforming to the size and shape of the bracket 17 and a pair of plates 66 fixed on the bracket 17 in spaced relation to the bracket and each other, each plate 66 having a boss 67 on the outer face thereof with one of the bosses supporting the outer end of the shaft 52, as shown in Figure 5.

The outer wall of the chute opposite the bracket 17 is removable and comprises a longitudinal plate portion 68 corresponding to the space between the plates 66 having opposite arcuate cutout portions 69 for a purpose to be hereinafter described, and an angular portion 70 projected from the outer face of the plate 68 with a leg of the angle portion extending parallelly of said plate 68 having an elongated opening 71 therein for the engagement of a securing member 72 rotatably mounted in one of the plates 65 and having a head 73 of a width greater than the width of the opening 71 but less than the length of said opening and of a thickness less than the width of said opening to permit the engagement of the plate 68 on the member 72 and said member retaining the plate 68 between the plates 66 in spaced relation to the bracket 17 by turning the member to position the width of the head thereof to extend transversely of the opening 71, as shown in Figures 1 and 3. To facilitate the mounting and removal of the plate 68 on the bracket 17 a manipulating member 74 is fixed in and projected from the leg of the angle portion 70 extending parallelly of the plate 68.

The caps engage in the chute 65 by gravity and to assure and facilitate said engagement the caps in the passage 44 are engaged and agitated relative to said chute by a pair of wheels 75, 76, wheel 75 having a smooth peripheral surface and fixed on the shaft 52 between the pinion 56 and the bracket 17, and the wheel 76 having a serrated or notched peripheral surface and fixed on a shaft 77 rotatably mounted in the boss 67 opposite the boss 67 engaged by the shaft 52 and a boss 78 in the bracket 17 in horizontal alined and spaced relation to the boss 55. The wheels 75, 76 are rotated in a direction toward each other, the wheel 76 being positively rotated from the wheel 75 through meshing gears 79, 80 fixed on the shafts 52, 77 exteriorly of the bosses 55, 78, respectively, as clearly shown in Figure 8, and are enclosed in a box-like cover 81 carried by the shelf 54.

The cutout portions 69 of the removable wall 68 of the chute 65 will permit the free rotation of the pinion 56 and wheel 76, as shown in Figure 8. Should a cap or caps become jammed between the feeding wheels 75, 76, the jammed caps may be quickly removed by disengaging the plate 68 from the securing member 72.

The caps engaged in the chute 65 either face toward or away from the bracket 17, and in order to deliver all of the caps in a predetermined position, in the present instance with the face or open end of the caps uppermost to be delivered in such position to apparatus for assembling sealing pads in the caps, the chute is arranged with diverging passages 82, 82a having grooves 83 in the opposite side walls extending at an angle corresponding to the declination of the passages for the engagement of the flared edge of the skirt of the caps and position the crown portion of the caps within an inner rectangular portion 84 of the passages, so that the caps facing away from the bracket 17 will be guided into the outer passage 82, and the caps facing toward the bracket will enter the inner passage 82a, as shown in Figures 5 and 6.

The passages 82, 82a are curved or twisted about their longitudinal axes at a point where the differently positioned caps have already been separated with the passages extending in the same plane transversely of the chute 65 and positioned side by side with an intervening wall 82', as shown in Figure 5.

To permit inspection of the caps and removal of any caps which may become jammed in the separating portion of the diverging passages 82, 82a, the front wall thereof is in the form of a plate 85 having an elongated opening 86 adjacent and parallel to one end thereof to be engaged by a retaining member 87 rotatably mounted in the bracket 17 and having a body portion slightly smaller than the width of the opening 86 and a head 88 of a width greater than the width of the opening 86 but less than the length of the opening and of a thickness less than the width of the opening, whereby the plate may be readily engaged and releasably retained on the member 87, a mere turning of said member 87 placing the head in or out of register with the opening 86. The engaging of the plate 85 on the retaining member is facilitated by a positioning member 89 fixed in and extended laterally from the face of the plate, as shown in Figures 1 and 4.

The caps are discharged from the apparatus in a single row by passing the caps from the passages 82, 82a to and through a distributing box 90 connected to the delivery end of the passages 82, 82a, said box having at the end adjacent said passages a chamber or passage 91 corresponding to the combined width of the passages 82, 82a with a wall adjacent the outer passage 82 converging in an arcuate direction toward the opposite wall, as at 92 to direct and guide the caps in said outer passage 82 toward the line of travel of the caps in the inner passage 82a and a single passage 93 in the box extending in line with said inner passage 82a and leading to an arcuate chute 94 supported by the box 90 to deliver the caps in a flat horizontal position. To prevent the caps from the outer passage 82 interfering with the travel of the caps from the inner passage 82a into the passage 93 and retain said caps in the outer passage until there is an interruption in the travel of the caps from the inner passage 82a to the passage 93, there is provided a continuously rotating wheel 95 mounted in a circular recess portion 96 arranged in the distributing box 90 intermediate the arcuate wall 92 and passage 93 with a peripheral portion of the wheel juxtaposed to a terminating end of the arcuate wall 92. The wheel 95 is fixed on a shaft 97 rotatably mounted in bosses 98 in the opposite walls of the box 90 with an end of the shaft projecting beyond a boss having a grooved pulley 99 fixed thereon engaged by a belt 100 passing around a grooved pulley 101 fixed on the end of the shaft 77 extending beyond the boss 67 to transmit the rotation of the pulley 50 to the wheel 95, as shown in Figure 2. The wheel 95 is rotated in an anti-clockwise direction, as indicated by the arrow in Figure 5, the peripheral portion thereof being serrated to assure the engagement of the flared serrated skirt of the leading cap in the passage 82 and the retention of said cap by the rotation of the wheel to permit the travel of caps from the passage 82a to the passage 93. It will readily be seen that by this arrangement of the passages 82, 82a and 93, and the wheel 95, there is assured a continuous delivery of caps from said passages to the chute 94 and from the latter to the apparatus to which the caps are to be fed.

While I have illustrated one embodiment of my invention, it will be obvious that various modifications may be made in the construction and arrangement of parts, and that portions of the invention may be used without others and come within the scope of the invention.

Having thus described my invention, I claim:

1. In closure cap feeding means, an annular member arranged with a series of angular portions of increased diameters, a casing supported by the annular member with an open end thereof in register with the portion of smallest diameter of the annular member, a drum engaging and rotatable in the two portions of smaller diameter of the annular member to receive caps from the casing, a disk rotatable with the drum in the portion of largest diameter of the annular member and mounted in spaced relation to the drum to permit passage of caps from the drum in flat position to the space between the drum and disk, and a chute leading from said portion of largest diameter of the annular member and the space between the disk and drum to receive caps positioned between the drum and disk.

2. Closure cap feeding means as claimed in claim 1, wherein the drum is arranged with a lateral flange extending flush with the outer wall of the angular portion of largest diameter of the annular member in parallel spaced relation with the disk.

3. In closure cap feeding means, a casing having the top and one end open and the bottom declining toward the open end, a plate of resilient material fixed at one end adjacent the open top of and extended into the casing in spaced and opposed relation to the open end of the casing to substantially close said open end, and means to vibrate the free end of the plate in a direction away from the open end to agitate the caps in the casing.

4. Closure cap feeding means as claimed in claim 3, wherein the plate is arranged with a projection on a face thereof, and the vibrating means comprises a rotary head having an uneven surface adapted by the rotation thereof to ride over the projection on and vibrate the plate.

5. In closure cap feeding means, a casing having an open end, a plate of resilient material fixed at one end to extend into the casing adjacent to and transversely of the open end with the free end thereof spaced from the bottom of the casing, a drum rotatably mounted in register with the open end of the casing, a disk mounted in spaced relation to and rotatable with the drum to permit passage of caps in flat position therebetween and said space having an outlet for the discharge of caps therefrom, means rotatable with the drum and disk adapted to impart vibratory movement to the resilient plate to agitate the caps in the casing, and means to rotate the drum, disk and plate vibrating means to effect continuous delivery of caps from the casing to the space between the drum and disk and discharge of the caps from the outlet of said space.

6. In closure cap feeding means, a casing having an open end, a drum having one end open and an annular passage at the opposite end for the engagement of caps in flat position, means to rotatably support the drum with the open end in register with the open end of the casing, a chute having the inlet open to and leading from the annular passage having a single passage to receive caps from said annular passage and diverging into a pair of passages, means at the juncture of the single and pair of passages of the chute to direct the caps with the faces turned in one direction into one of the pair of passages and the caps with the faces turned in the opposite direction into the other of said pair of passages, said pair of passages being extended from the single passage and arranged to position the caps passing through said pair of passages with the faces extending in the same direction, and means at the discharge end of the pair of passages to retard and cause the discharge of caps from one of said pair of passages alternately with the discharge of caps from the other passage of said pair of passages.

7. Closure cap feeding means as claimed in claim 6, wherein the means for retarding the discharge of caps from one passage of the chute comprises a wheel mounted to engage the foremost cap in said passage, and means to rotate the wheel in a direction opposed to the travel of the caps in said chute.

8. In closure cap feeding means, a casing having an open end, a drum having one end open and an annular passage for caps at the opposite end and rotatably mounted with the open end in register with the open end of the casing, a chute leading from the annular passage to receive caps from said passage, a pair of wheels positively driven one from the other and mounted in spaced alinement on opposite sides of the chute with the peripheries intersecting the chute to engage and cause the caps in the drum passage at both sides of the chute to enter into said chute, and means to rotate the pair of wheels, and one of said wheels being operatively connected to the drum to impart rotation to the drum.

9. In closure cap feeding means, a bracket having an annular portion, a casing having an open end and a bottom declining from the horizontal toward said open end and mounted on the annular portion of the bracket with the open end of the casing in alinement with the opening in the annular portion, a drum, means supported by the annular portion of the bracket and arranged to rotatably support the drum in the annular portion in registry with the open end of the casing to receive caps from the casing, a disk mounted on the drum support within the annular portion of the bracket and in predetermined spaced relation to the outer end of and rotatable with the drum, said drum and disk co-operating with the annular portion of the bracket to arrange the space between the drum and disk as an annular passage to receive caps in flat position from the drum, and a chute communicating with the annular passage through the wall of the annular portion to receive and deliver caps from the annular passage.

10. In closure cap feeding means, a casing having an open end and a bottom declining from the horizontal toward said open end, an annular fixed member at the open end of the casing, a drum, means to rotatably support the drum in the annular member at the open end of the casing, a disk arranged on the drum support in predetermined spaced relation to the outer end of and rotatable with the drum, said disk and drum co-operating with the annular member to arrange the space between the drum and disk as an annular passage to receive caps in flat position, said drum adapted to receive caps delivered from the casing through the open end and through the rotation thereof position the caps in the annular passage, a chute communicating with the annular passage through the wall of the annular member below the axis of rotation of the drum, a pair of rotatable wheels at opposite sides of and at the entrance to the chute operative by the rotation thereof to cause the caps to enter the chute from the annular passage, a gear rotatable with one of said wheels to mesh with gear teeth about the periphery of the disk to rotate the disk and drum from the rotation of said wheels, and means to pivotally mount the drum and disk supporting means to permit the moving of the drum and disk away from and to the open end of the casing and as the disk is moved to the open end of the casing mesh the gear teeth thereof with the gear rotatable with one of the wheels.

JOHN A. JOHNSON.